United States Patent [19]

Kurashima

[11] Patent Number: 5,045,698
[45] Date of Patent: Sep. 3, 1991

[54] RADIATION IMAGE INFORMATION RECORDING AND READING SYSTEM

[75] Inventor: Kazuyuki Kurashima, Kanagawa, Japan

[73] Assignee: Fuji Photo Film Co., Ltd., Kanagawa, Japan

[21] Appl. No.: 599,934

[22] Filed: Oct. 19, 1990

[30] Foreign Application Priority Data

Oct. 20, 1989 [JP] Japan .................................. 1-274368
Oct. 20, 1989 [JP] Japan .................................. 1-274372

[51] Int. Cl.$^5$ ...................... G03B 42/02; G01T 1/105
[52] U.S. Cl. .................................. 250/327.2; 271/259
[58] Field of Search ................ 271/259; 250/327.2 R, 250/327.2 A, 327.2 B, 327.2 C, 327.2 D, 327.2 E, 327.2 F, 327.2 G, 327.2 H, 327.2 J, 328.2 K, 327.2 L, 484.1 D

[56] References Cited

U.S. PATENT DOCUMENTS

| | | |
|---|---|---|
| 4,258,264 | 3/1981 | Kotera et al. . |
| 4,276,473 | 6/1981 | Kato et al. . |
| 4,315,318 | 2/1982 | Kato et al. . |
| 4,341,462 | 7/1982 | Ogura ............................ 271/259 |
| 4,387,428 | 6/1983 | Ishida et al. . |
| 4,400,619 | 8/1983 | Kotera et al. . |
| 4,456,239 | 6/1984 | Yamaguchi ..................... 250/327.2 |
| 4,640,507 | 2/1987 | Ohgoda et al. . |
| 4,705,953 | 11/1987 | Kimura et al. .................. 250/484.1 |
| 4,853,540 | 8/1989 | Nakajima ........................ 250/327.2 |

FOREIGN PATENT DOCUMENTS

| | | |
|---|---|---|
| 0172417 | 2/1986 | European Pat. Off. ......... 250/327.2 |
| 56-11395 | 2/1981 | Japan . |
| 56-12599 | 2/1981 | Japan . |
| 61-95342 | 5/1986 | Japan ............................. 250/327.2 |

Primary Examiner—Constantine Hannaher
Assistant Examiner—Edward J. Glick
Attorney, Agent, or Firm—Sughrue, Mion, Zinn, Macpeak & Seas

[57] ABSTRACT

A radiation image information recording and reading system includes a circulatory feed system for feeding a stimulable phosphor sheet, an image recording device for recording radiation image information in the stimulable phosphor sheet, an image reading device for reading the recorded radiation image information from the stimulable phosphor sheet, and a remaining image erasing device for discharging radiation energy remaining on the stimulable phosphor sheet before the stimulable phosphor sheet is readied for another recording cycle. Stimulable phosphor sheets loaded in the system are detected by sheet sensors, so that the number and positions of stimulable phosphor sheets in the system can be confirmed. Whether there is a predetermined number of stimulable phosphor sheets in the system can also be confirmed based on the information with regard to the number and positions of the stimulable phosphor sheets. The stimulable phosphor sheets may be fed to desired positions in the system based on the above information, so that the stimulable phosphor sheets can be processed smoothly during operation of the system. The system has a display unit for displaying the detected number of stimulable phosphor sheets.

5 Claims, 6 Drawing Sheets

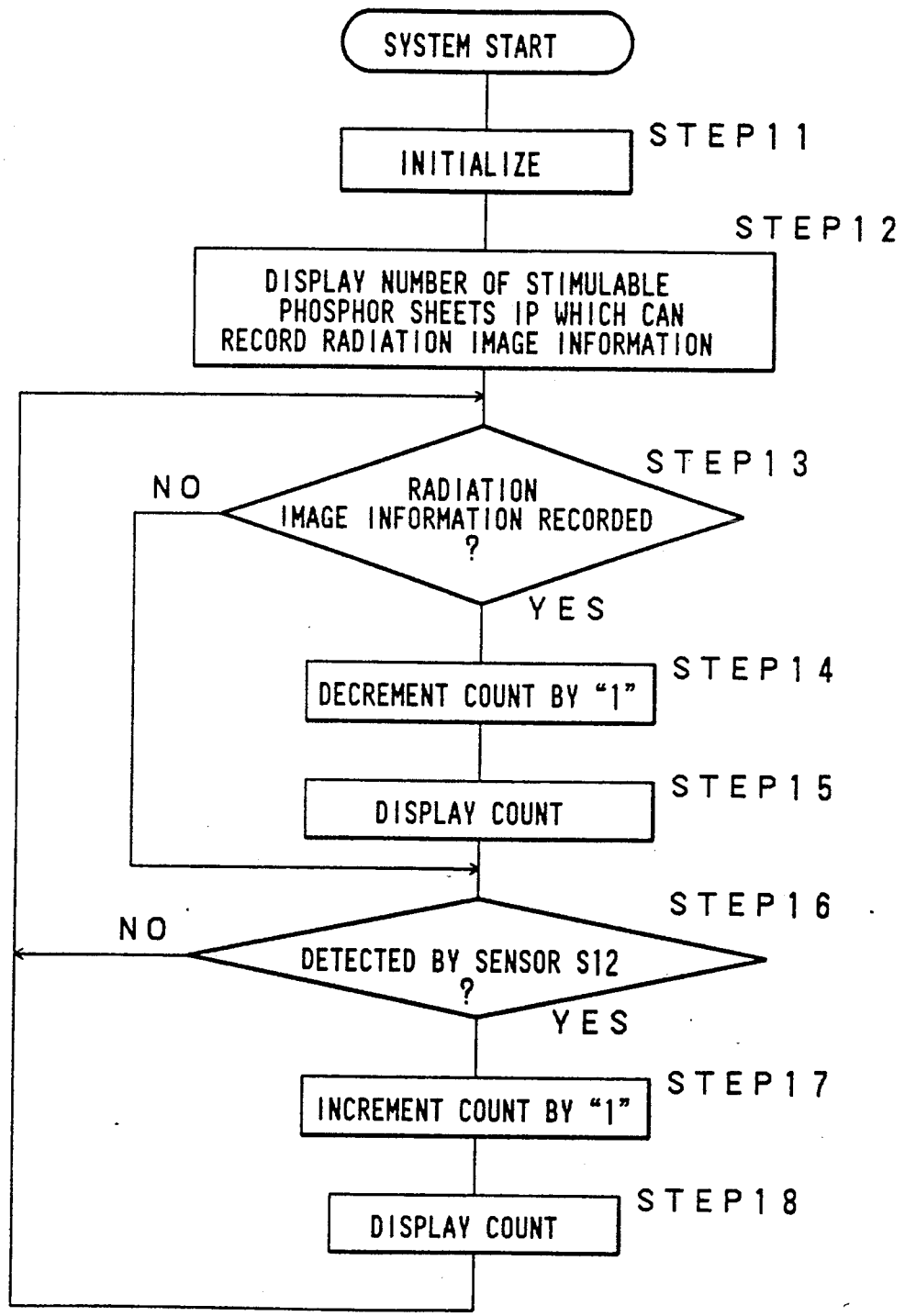

RADIATION IMAGE INFORMATION RECORDING AND READING SYSTEM

BACKGROUND OF THE INVENTION

1. Field of the Invention

The present invention relates to a radiographic system or radiation image information recording and reading system for repetitiously recording and reading radiation images in image recording mediums such as stimulable phosphor sheets while they are being circulated through an image recording device, an image reading device, and a remaining image erasing device by a feed system, the radiation image information recording and reading system having means for confirming and displayed, if necessary, the number and positions of stimulable phosphor sheets which are loaded in the system.

2. Prior Art

There are known radiographic systems or radiation image information recording and reading systems which record radiation image information in stimulable phosphor sheets. The stimulable phosphor sheet is a sheet having a layer of stimulable phosphor. The stimulable phosphor is a phosphorous material which, when exposed to radiation such as X-rays, $\alpha$-rays, $\beta$-rays, $\gamma$-rays, cathode rays, or ultraviolet rays, stores a part of the energy of the radiation. When the phosphor exposed to the radiation is subsequently exposed to stimulating rays such as visible light, the phosphor emits light in proportion to the stored energy of the radiation.

In various proposed radiation image information recording and reading systems employing stimulable phosphor sheets, the radiation image information of an object such as a human body is recorded in a stimulable phosphor sheet, the stimulable phosphor sheet is then scanned with stimulating rays of light to emit light representing the recorded radiation image information, and then the emitted light is photoelectrically read to produce an image signal which is subsequently processed to produce a radiation image that can be used for suitable purpose such as medical diagnosis (see Japanese Laid-Open Patent Publication Nos. 55(1980)-12429, 56(1981)-11395, 55(1980)-163472, 56(1981)-104645, and 55(1980)-116340, for example). In such a system, a final image may be reproduced as a visible image on a hard copy or displayed as a visible image on a CRT. In the radiation image information recording and reading systems, the stimulable phosphor sheet does not serve as a final image information recording medium, but as an image storage medium for temporarily storing image information which is to be retrieved as a visible image on a final image information recording medium. Therefore, the stimulable phosphor sheet may be repetitiously used and, preferably, should be so used for economic reasons.

A radiation image information recording and reading system employing stimulable phosphor sheets may be mounted on a mobile station such as a mobile X-ray radiographic vehicle, and the mobile station may be sent to different places for taking X-ray images of the bodies of people in groups for diagnostic purpose. In such an application, it is not convenient to carry a number of stimulable phosphor sheets on the mobile station, and the number of stimulable phosphor sheets that can be carried on the mobile station is limited. Repetitious use of a limited number of stimulable phosphor sheets in a radiation image information recording and reading system on such a mobile station is therefore practically advantageous for taking X-ray body images of many people. Such X-ray images can be taken successively at high speed through repetitious use of stimulable phosphor sheets.

In order to make a used stimulable phosphor sheet ready and available for recording radiation image information again, radiation energy remaining in the stimulable phosphor sheet after light representing previously recorded radiation image information has been emitted and read has to be discharged or erased upon exposure to erasing light rays, in the manner disclosed in Japanese Laid-Open Patent Publication Nos. 56(1981)-11392 and 56(1981)-12599.

The inventor of the present invention has proposed a built-in-type radiation image information recording and reading system which comprises a circulatory feed means for feeding a stimulable phosphor sheet, which can record a radiation image, along a circulatory path, an image recording device in the circulatory path for applying radiation which bears image information to the stimulable phosphor sheet to record radiation image information in the stimulable phosphor sheet, a stimulating light source in the circulatory path for emitting stimulating light rays to scan the stimulable phosphor sheet with the radiation image information recorded therein, an image reading device having a photoelectric transducer for reading light emitted from the stimulable phosphor sheet upon exposure to the stimulating light rays and producing an image signal from the read light, and a remaining image erasing device in the circulatory path for discharging radiation energy remaining on the stimulable phosphor sheet after the recorded radiation image information has been read in the image reading device and before another radiation image is recorded in the stimulable phosphor sheet in the image recording device, the devices being incorporated in a single housing of the system. The stimulable phosphor sheet is circulated through the devices for repetitious use. The proposed radiation image information recording and reading system is disclosed in Japanese Laid-Open Patent Publication Nos. 59(1984)-192240 and 60(1985)-176032, for example.

The radiation image information recording and reading system is usually loaded with a predetermined number of stimulable phosphor sheets. Desired radiation images can successively be recorded in the stimulable phosphor sheets when the stimulable phosphor sheets are successively fed into the image recording device.

The radiation image information recording and reading system will have trouble if the number or positions of the loaded stimulable phosphor sheets are unknown. For example, if the radiation image information recording and reading system assumes that it is loaded with a predetermined number of stimulable phosphor sheets when the actual number of loaded stimulable phosphor sheets is less than the predetermined number, then the feeding of the stimulable phosphor sheets through the system cannot well be controlled. If the positions of loaded stimulable phosphor sheets are unknown in the radiation image information recording and reading system when the system is to be started again after operational interruptions due to a power failure, for example, then it will be impossible to initialize the system for the purpose of feeding the stimulable phosphor sheets to optimum positions.

If no information is available as to whether the radiation image information recording and reading system is presently in a condition to record a radiation image in a stimulable phosphor sheet or not, or how long the system has to wait until a next radiation image can be recorded, then the time needed for the system to wait before a next radiation image can be recorded is not given, keeping the object or human body unduly strained.

SUMMARY OF THE INVENTION

It is a major object of the present invention to provide a radiation image information recording and reading system which is capable of confirming the number and positions of stimulable phosphor sheets when the system starts to operate.

Another object of the present invention is to provide a radiation image information recording and reading system which can feed stimulable phosphor sheets to predetermined positions for smooth image processing operation based on the information that has been obtained with regard to the number of the stimulable phosphor sheets.

Still another object of the present invention is to provide a radiation image information recording and reading system which can confirm the number of stimulable phosphor sheets that can successively record radiation image information therein.

According to the present invention, there is provided a radiation image information recording and reading system comprising circulatory feed means for feeding stimulable phosphor sheets, which can record radiation images, along a circulatory path, an image recording device in the circulatory path for applying radiation which bears image information to one at a time of the stimulable phosphor sheets to record radiation image information in the stimulable phosphor sheet, a stimulating light source in the circulatory path for emitting stimulating light rays to scan the stimulable phosphor sheet with the radiation image information recorded therein, an image reading device having a photoelectric transducer for reading light emitted from the stimulable phosphor sheet upon exposure to the stimulating light rays and producing an image signal from the read light, a remaining image erasing device in the circulatory path for discharging radiation energy remaining on the stimulable phosphor sheet after the recorded radiation image information has been read in the image reading device and before another radiation image is recorded in the stimulable phosphor sheet in the image recording device, memory means for storing the number of stimulable phosphor sheets loaded in the radiation image information recording and reading system, sheet detecting means disposed in the circulatory path, for detecting stimulable phosphor sheets, counting means for counting the number of stimulable phosphor sheets detected by the sheet detecting means, actuating means for actuating the circulatory feed means to feed the stimulable phosphor sheets to predetermined positions, control means for controlling the actuating means when the radiation image information recording and reading system starts to operate, and comparing means for comparing the number of stimulable phosphor sheets stored in the memory means with the number of stimulable phosphor sheets counted by the counting means when the radiation image information recording and reading system starts to operate.

The sheet detecting means comprises a plurality of sensors disposed in the circulatory path, the counting means comprising means for totaling detected signals from the sensors, thereby counting the number of stimulable phosphor sheets.

The control means comprises means for controlling the actuating means to feed the stimulable phosphor sheets from initial positions to positions where they are first detected by the sheet detecting means.

According to the present invention, there is also provided a radiation image information recording and reading system comprising circulatory feed means for feeding stimulable phosphor sheets, which can record radiation images, along a circulatory path, an image recording device in the circulatory path for applying radiation which bears image information to one at a time of the stimulable phosphor sheets to record radiation image information in the stimulable phosphor sheet, a stimulating light source in the circulatory path for emitting stimulating light rays to scan the stimulable phosphor sheet with the radiation image information recorded therein, an image reading device having a photoelectric transducer for reading light emitted from the stimulable phosphor sheet upon exposure to the stimulating light rays and producing an image signal from the read light, a remaining image erasing device in the circulatory path for discharging radiation energy remaining on the stimulable phosphor sheet after the recorded radiation image information has been read in the image reading device and before another radiation image is recorded in the stimulable phosphor sheet in the image recording device, a pre-exposure stand-by device disposed between the remaining image erasing means and the image recording device, for holding at least one stimulable phosphor sheet therein, sheet detecting means disposed in a predetermined position in the pre-exposure stand-by device and the image recording device, for detecting a stimulable phosphor sheet and producing a detected signal indicative of the detected stimulable phosphor sheet, image recording detecting means for detecting the recording of radiation image information in the stimulable phosphor sheet in the image recording device, and for producing an image recording signal indicative of the detected recording of radiation image information, counting means for counting the number of stimulable phosphor sheets which can record radiation image information and is positioned in the predetermined position in the pre-exposure stand-by device and the image recording device, based on the detected signal from the sheet detecting means and the image recording signal from the image recording detecting means, and display means for displaying the number of stimulable phosphor sheets counted by the counting means.

The counting means comprises means for subtracting a value based on the image recording signal from a total value of detected signals from the sheet detecting means.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a flowchart of an operation sequence of the arrangement, shown in FIG. 5, in the control device.

DETAILED DESCRIPTION OF THE PREFERRED EMBODIMENT

Figure 1:
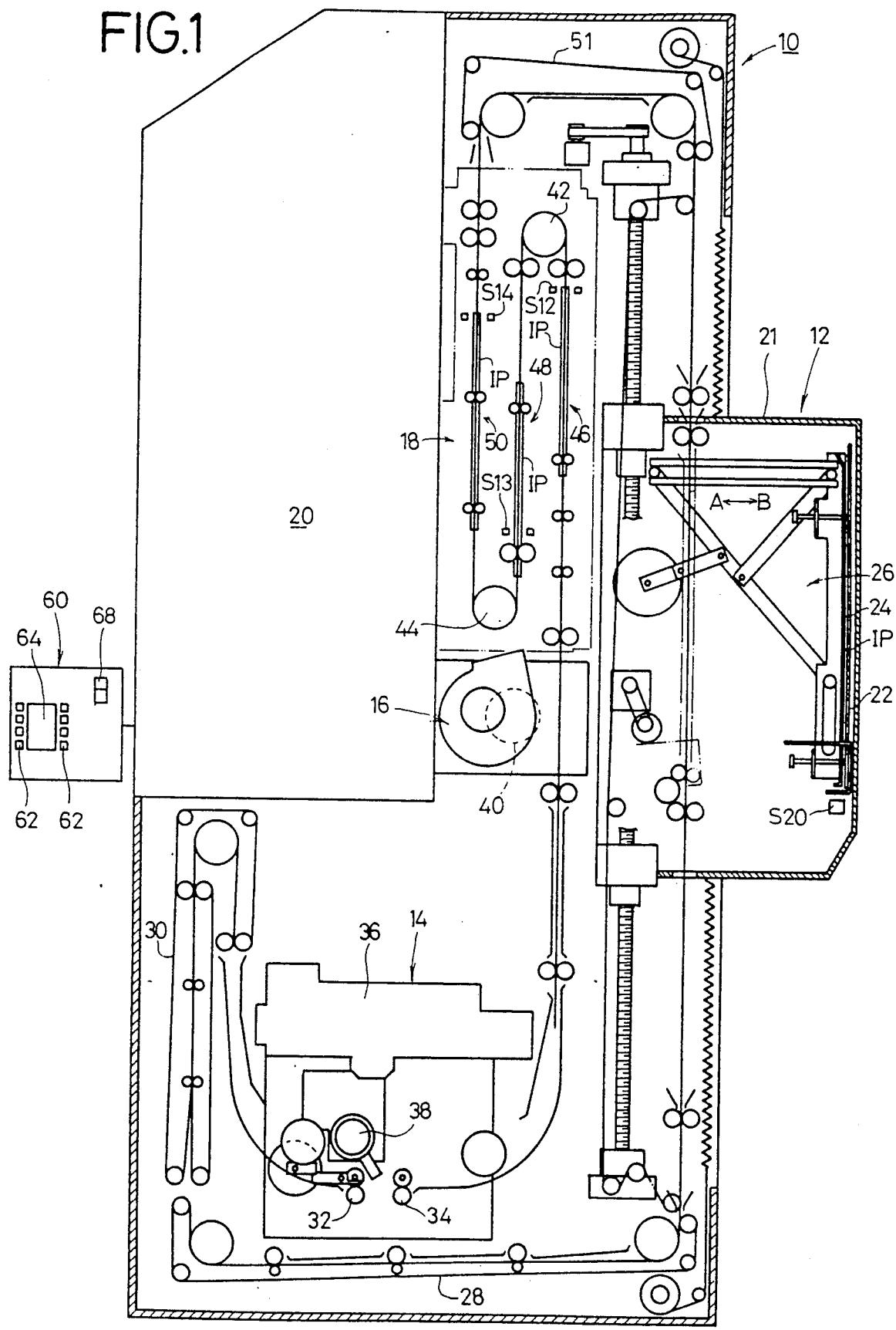
FIG. 1 is a schematic vertical cross-sectional view of a radiation image information recording and reading system which incorporates a device for confirming stimulable phosphor sheets according to the present invention.

FIG. 1 shows a radiation image information recording and reading system 10 according to the present invention. The radiation image information recording and reading system 10 generally comprises an image recording device 12, an image reading device 14, a remaining image erasing device 16, a pre-exposure stand-by device 18, and a control device 20. The image recording device 12, the image reading device 14, the remaining image erasing device 16, and the pre-exposure stand-by device 18 are interconnected by a feed system which feeds stimulable phosphor sheets IP.

The image recording device 12 includes an exposure unit 21 projecting forwardly of a front panel of the radiation image information recording and reading system 10, and movable vertically along the front panel. The exposure unit 21 has a link mechanism 26 disposed therein, the link mechanism 26 being displaceable in the directions indicated by the arrows A, B while sandwiching a stimulable phosphor sheet IP between front and rear plates 22, 24. A shutter mechanism is mounted on lower ends of the front and rear plates 22, 24, for releasing a stimulable phosphor sheet IP when the link mechanism 26 has been displaced in the direction indicated by the arrow A, and for holding a stimulable phosphor sheet IP when the link mechanism 26 is to be displaced in the direction indicated by the arrow B.

The image reading device 14 is connected to the image recording device 12 by feed system assemblies 28, 30. The image reading device 14 includes two pairs of nip rollers 32, 34 for gripping a stimulable phosphor sheet IP supplied from the feed system assembly 30, an optical unit 36 for applying a scanning laser beam to the stimulable phosphor sheet IP between the nip rollers 32, 34, and a light guide unit 38 including a photoelectric transducer for readlight, which is representative of the radiation image information recorded in the stimulable phosphor sheet IP, emitted from the stimulable phosphor sheet IP upon exposure to the scanning laser beam.

The remaining image erasing device 16 is disposed downstream, or upwardly, of the image reading device 14. The remaining image erasing device 16 has an erasing light source 40 such as a halogen lamp for emitting erasing light rays to erase or discharge radiation energy remaining in the stimulable phosphor sheet IP.

The pre-exposure stand-by device 18 is located downstream, or upwardly, of the remaining image erasing device 16. The pre-exposure stand-by device 18 comprises a feed system assembly having a feed path which is bent by rollers 42, 44. The feed system assembly of the pre-exposure stand-by device 18 includes a first stand-by zone 46, a second stand-by zone 48, and a third stand-by zone 50. The pre-exposure stand-by device 18 is connected to the image recording device 12 through a feed system assembly 51.

The control device 20 serves to control operation of the radiation image information recording and reading system 10, and is connected to a control console 60 disposed outside of the housing of the system 10 The control console 60 comprises an input unit 62 for setting conditions for operating the radiation image information recording and reading system 10, a display unit 64, and a power supply switch 68 for turning on and off the power supply of the radiation image information recording and reading system 10.

Figure 2:
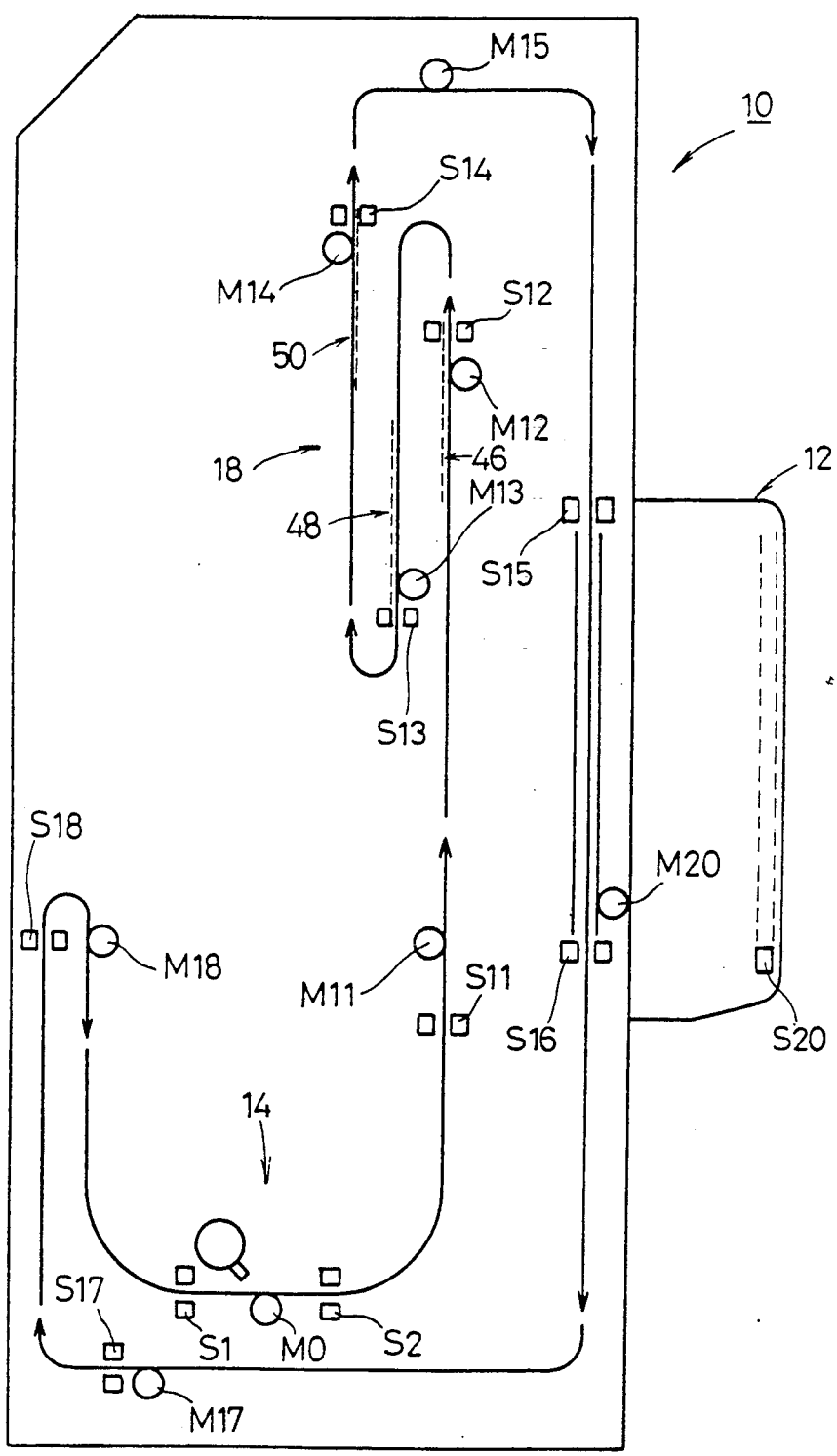
FIG. 2 is a schematic view showing the locations of sensors and motors in the radiation image information recording and reading system shown in FIG. 1.

FIG. 2 schematically shows actuating means, of the feed system, for feeding the stimulable phosphor sheets IP to predetermined regions or positions in the radiation image information recording and reading system 10, and sheet detecting means, positioned near the actuating means, for detecting the positions of the stimulable phosphor sheets IP. The actuating means comprise various motors, and the sheet detecting means comprise various sensors. More specifically, the first stand-by zone 46 is associated with a motor M12 and a sensor S12 disposed therein, the second stand-by zone 48 with a motor M13 and a sensor S13 disposed therein, and the third stand-by zone 50 with a motor M14 and a sensor S14 disposed therein. The radiation image information recording and reading system further has other motors M0, M11, M15, M17, M18, M20 and other sensors S1, S2, S11, S15, S16, S17, S18, S20. The motor M0 and the sensors S1, S2 are associated with the image reading device 14. The motor M17 and the sensor S17 are associated with the feed system assembly 28, and the motor M18 and the sensor S18 are associated with the feed system assembly 30. The motor M20 and the sensors S15, S16, S20 are associated with the image recording device 12.

Figure 3:
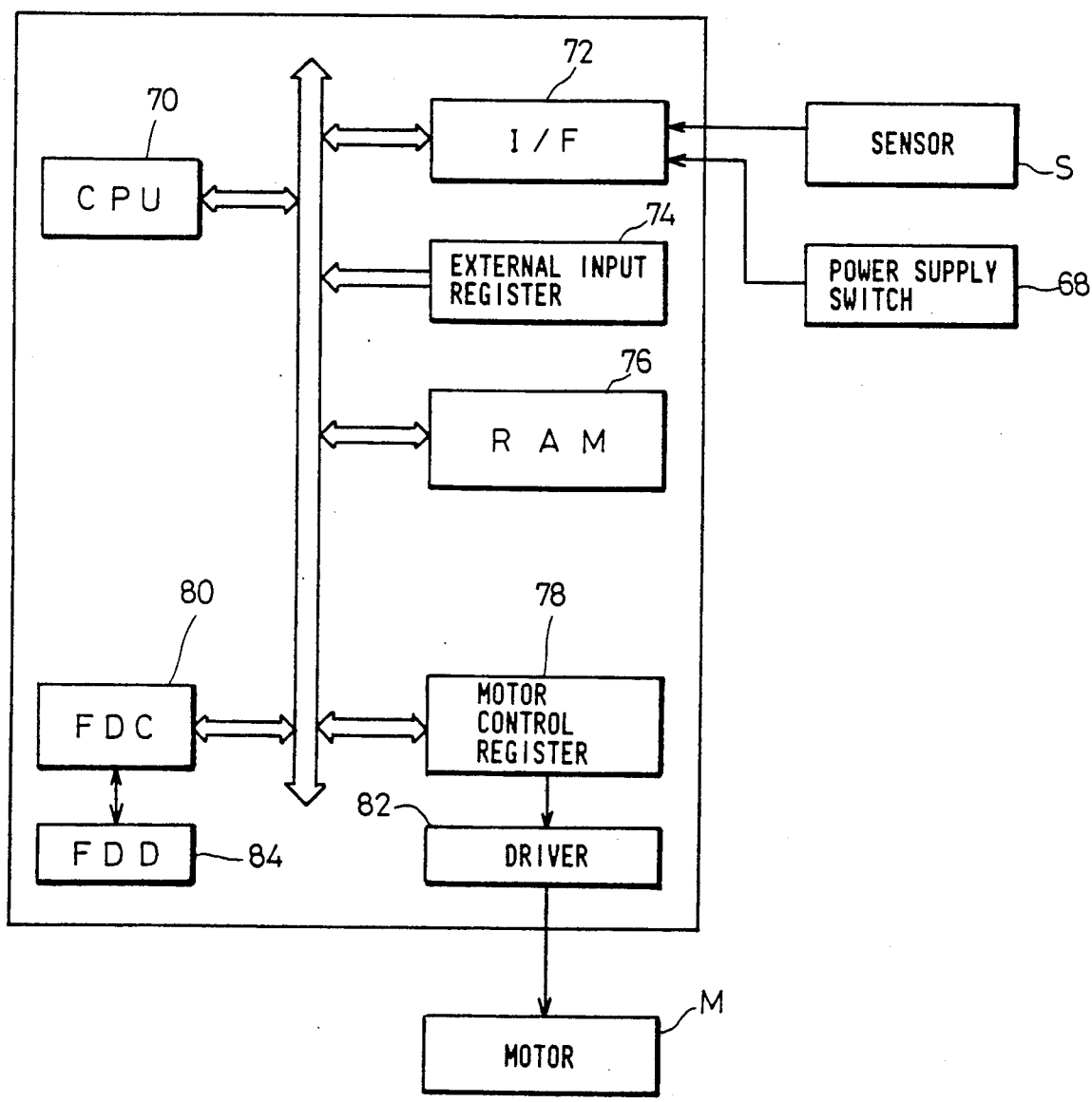
FIG. 3 is a block diagram of an arrangement for confirming the positions and number of stimulable phosphor sheets, in a control device in the system shown in FIG. 1.

FIG. 3 shows in block form an arrangement for confirming the positions and number of stimulable phosphor sheets IP, in the control device 20 of the radiation image information recording and reading system 10. As shown in FIG. 3, the control device 20 has a CPU 70, as a control means, for controlling operation of desired ones of the motors, collectively denoted at M, in the system 10. The control device 20 also has an interface 72, an external input register 74, a RAM 76, a motor control register 78, and a floppy disk controller 80, which are connected to the CPU 70. The CPU 70 also doubles as a counting means and a comparing means, as described later on.

The sensors, collectively denoted at S, and the power supply switch 68 are connected to the interface 72. Input signals transmitted from the sensors S and the power supply switch 68 are stored as external input data in the external input register 74. The motor control register 80 is a register for holding data with respect to driven conditions of the motors M. The motors M are controlled, i.e., energized and de-energized, by a driver 82 based on the driven conditions stored in the motor control register 80. The floppy disk controller 80 serves to control a floppy disk driver 84 which is loaded with a floppy disk (not shown) that stores data about the number of stimulable phosphor sheets IP loaded in the radiation image information recording and reading system 10. When the radiation image information recording and reading system 10 starts to operate, the number data stored in the floppy disk are loaded into RAM 76 through the floppy disk controller 80.

The radiation image information recording and reading system 10 is basically constructed as above. Operation and advantages of the radiation image information recording and reading system will now be described below.

The radiation image information recording and reading system 10 is loaded with a total of four stimulable phosphor sheets IP, which are placed respectively in an exposure position in the image recording device 12, the first stand-by zone 46, the second stand-by zone 48, and the third stand-by zone 50 of the pre-exposure stand-by device 18.

After an object is placed in front of the exposure unit 21 of the image recording device 12, X-rays are applied from an X-ray source to the object. The X-rays are transmitted through the object into the image recording device 12, thus recording a transmitted-radiation image in the stimulable phosphor sheet IP in the exposure position.

The stimulable phosphor sheet IP with the image recorded therein is displaced in the direction indicated by the arrow A by the link mechanism 26, and is thereafter fed to the image reading device 14 through the feed system assemblies 28, 30.

In the image reading device 14, the stimulable phosphor sheet IP is gripped and transferred by the nip rollers 32, 34, while at the same time a laser beam is applied to the stimulable phosphor sheet IP by the optical unit 36. Light, representative of the radiation image information stored in the stimulable phosphor sheet IP, is then emitted from the stimulable phosphor sheet IP and guided by the light guide unit 38. The light is then converted into an electric signal by a photoelectric transducer connected to the light guide unit 38.

The stimulable phosphor sheet IP from which the radiation image information has been read is thereafter fed into the remaining image erasing device 16, in which remaining radiation energy is discharged from the stimulable phosphor sheet IP by the erasing light source 40.

After the remaining radiation energy is erased, the stimulable phosphor sheet IP is delivered into the first stand-by zone 46 of the pre-exposure stand-by zone 18, so that the stimulable phosphor sheet IP is readied for a next exposure cycle. The stimulable phosphor sheets IP which have been placed respectively in the first, second, and third stand-by zones 46, 48, 50 are successively fed into the image recording device 12 for respective exposure cycles. In the image recording device 12, the transferred stimulable phosphor sheet IP is sandwiched between the front and rear plates 22, 24, and the link mechanism 26 is displaced in the direction indicated by the arrow B until the sandwiched stimulable phosphor sheet IP is brought into the exposure position.

If an accident such as a power failure occurs while the radiation image information recording and reading system 10 is in operation, the operation of the system 10 is interrupted. Therefore, the stimulable phosphor sheets IP being fed are stopped in respective positions at the time of the power failure. According to the present embodiment, when the radiation image information recording and reading system 10 starts to operate again, the positions and number of the stimulable phosphor sheets IP can be confirmed, and the system 10 can be initialized into an optimum condition based on the confirmed positions and number of the stimulable phosphor sheets IP.

Figure 4:
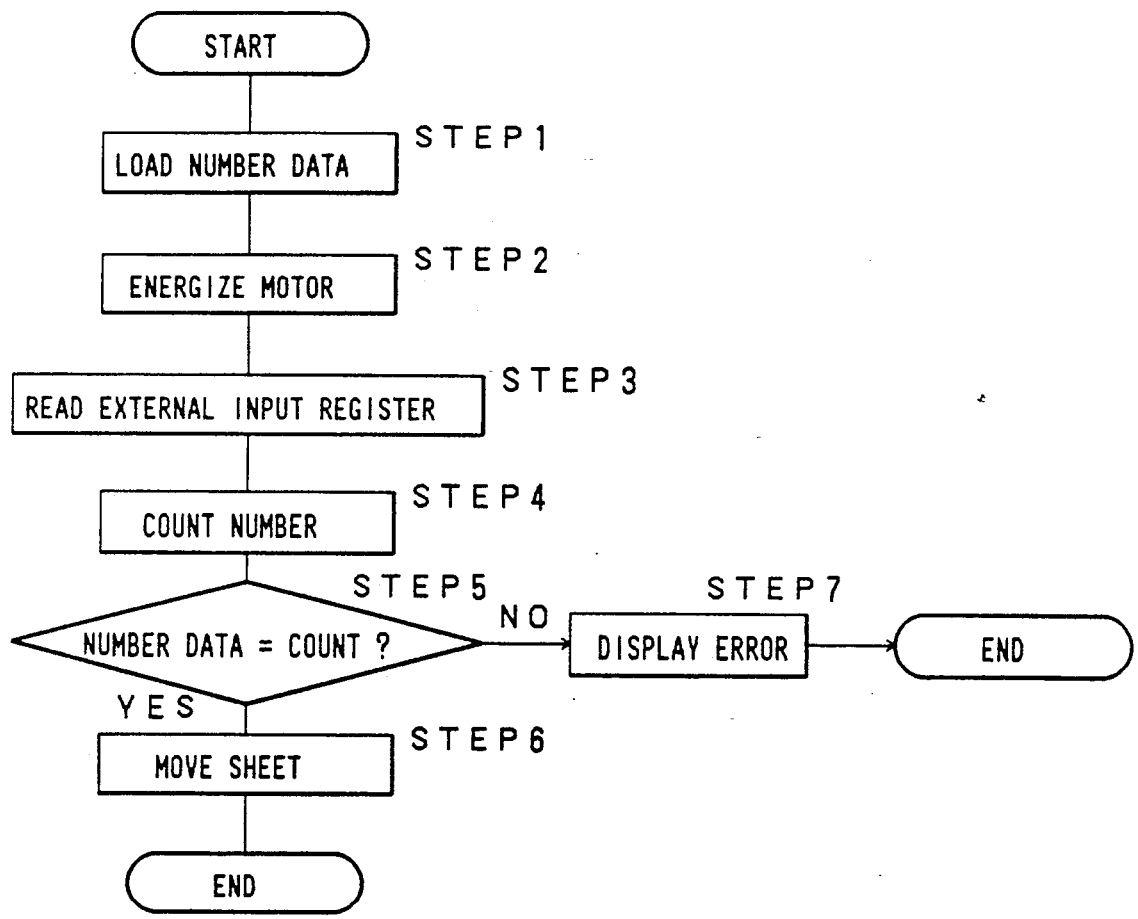
FIG. 4 is a flowchart of an operation sequence of the arrangement, shown in FIG. 3, in the control device.

A process of confirming the positions and number of stimulable phosphor sheets IP will hereinafter be described with reference to the flowchart of FIG. 4.

When the power supply switch 68 is turned on by the operator of the system 10, the CPU 70 reads data about the predetermined number of stimulable phosphor sheets IP to be loaded in the radiation image information recording and reading system 10, from the floppy disk loaded in the floppy disk drive 84, and then loads the read number data into the RAM 76 in a step STP1. Then, the CPU 70 applies an energization command signal to the motor control register 78 in order to energize the motors M which feed the stimulable phosphor sheets IP. In response to the applied energization command signal, the driver 82 starts to energize the motors M for thereby feeding the stimulable phosphor sheets IP in the radiation image information recording and reading system 10 in a step STP2. The motors M are energized for the reason below. If a stimulable phosphor sheet IP has stopped between the sensors S11, S12, the motor M12 is energized to feed the stimulable phosphor sheet IP up to the sensor S12. When the stimulable phosphor sheet IP reaches the sensor S12, the presence of the stimulable phosphor sheet IP at the sensor S12 can be confirmed by the sensor S12.

After the motors M have been energized for a given period of time in the step STP2, the CPU 70 reads data from the external input register 74 in a step STP3. At this time, flags have been set in the external input register 74 when the stimulable phosphor sheets IP have been detected by the sensors S. The CPU 70 counts the number of those flags in the external input register 74, thus determining the number of stimulable phosphor sheets IP that are actually loaded in the radiation image information recording and reading system 10 in a step STP4.

Then, the CPU 70 compares the data about the predetermined number of stimulable phosphor sheets IP, which data are stored in the RAM 76, with the count determined in the step STP4 in a step STP5. If the count is equal to the predetermined number, then the CPU 70 starts a feed task corresponding to the number of stimulable phosphor sheets IP, thereby moving the stimulable phosphor sheets IP to next empty regions based on the positional information of the stimulable phosphor sheets IP which is detected by the sensors S, in a step STP6. If the count is different to the predetermined number, then the CPU 70 displays an error message on the display unit 64 in a step STP7, and the processing comes to an end.

The sensors S can also detect empty regions where no stimulable phosphor sheets IP are present, as well as positions or regions where stimulable phosphor sheets IP are present. When stimulable phosphor sheets IP are transferred into those empty regions in advance, the radiation image information recording and reading system 10 can effect an efficient image processing operation.

Detection of the number of stimulable phosphor sheets IP which can record radiation image information in the radiation image information recording and reading system 10 will now be described below.

Figure 5:
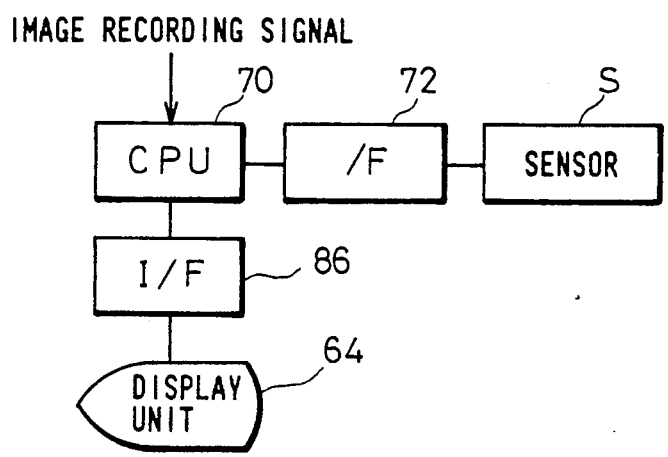
FIG. 5 is a block diagram of an arrangement for detecting the number of stimulable phosphor sheets that can recording radiation image information, in the control device.

FIG. 5 shows an arrangement, in the control device 20, for detecting the number of stimulable phosphor sheets IP which can record radiation image information in the radiation image information recording and reading system 10. The sensors S12, S13, S14 in the pre-exposure stand-by device 18 and the sensor S20 in the image recording device 12 are connected to the CPU 70 of the control device 20 through the interface 72. The display unit 64 of the control console 60 is also connected to the CPU 70 through an interface 86. The CPU 70 can be supplied with an image recording signal from the radiation source, which signal indicates that a radiation image is recorded in a stimulable phosphor sheet IP upon exposure to radiation emitted from the radiation source.

Information representing how many stimulable phosphor sheets IP can successively be supplied to the exposure position is displayed in a real-time manner on the display unit 64 of the control console 60. An operation process of the control device 20 for displaying such information will be described below with reference to the flowchart shown in FIG. 6.

When the power supply switch 68 of the control console 60 is turned on by the operator, one stimulable phosphor sheet IP is fed into the exposure position in the image recording device 12, and other three stimulable phosphor sheets IP are fed into the respective first, second, and third stand-by zones 46, 48, 50 in a step STP11.

Since all the four stimulable phosphor sheets IP can record radiation image information, the CPU 70 sets "4" as a count indicating the number of stimulable phosphor sheets IP which can record radiation image information, and transfers the count through the interface 85 to the display unit 64. The display unit 64 now displays the count "4" or the present number of stimulable phosphor sheets IP that can record radiation image information in a step STP12.

Then, when the CPU 70 receives an image recording signal indicating that a radiation image is recorded in the stimulable phosphor sheet IP in the exposure position upon exposure to radiation from the radiation source in a step STP13, the CPU 70 subtracts "1" from the count representing the number of stimulable phosphor sheets IP which can record radiation image information in a step SPT14, and the resulting count is displayed on the display unit 64 in a step STP15.

The stimulable phosphor sheets IP which have been held in a stand-by condition in the first, second, and third stand-by zones 46, 48, 50, respectively, are successively transferred into the exposure position for recording radiation image information. As radiation image information is recorded successively in these stimulable phosphor sheets IP, the count is successively decremented by "1".

The stimulable phosphor sheet IP which has just recorded radiation image information in the image recording device 12 is fed successively through the image reading device 14 and the remaining image erasing device 16. After the recorded radiation image information is read from the stimulable phosphor sheet IP by the image reading device 14 and remaining radiation energy is erased from the stimulable phosphor sheet IP by the remaining image erasing device 16, the stimulable phosphor sheet IP is fed into the first stand-by zone 46. When the CPU 70 detects arrival of the stimulable phosphor sheet IP at the first stand-by zone 46 based on a detected signal from the sensor S12 in a step STP16, the CPU 70 increments the number of stimulable phosphor sheets IP that can record radiation image information by "1" in a step STP17. Then, the CPU 70 displays the resulting count on the display 64 in a step STP18.

As described above, the display unit 64 of the control console 60 connected to the system 10 displays the number of stimulable phosphor sheets IP which can record radiation image information, on a real-time basis. Therefore, the operator of the system 10 can easily confirm the number of stimulable phosphor sheets IP which can record radiation information, based on the count displayed on the display unit 64.

With the present invention, as described above, when the radiation image information recording and reading system starts to operate, stimulable phosphor sheets are fed by the actuating means and detected by the sheet detecting means, so that the number of stimulable phosphor sheets in the radiation image information recording and reading system can be confirmed. The positions of the stimulable phosphor sheets in the system can also be detected by the sheet detecting means. Based on the information indicative of the number and positions of the loaded stimulable phosphor sheets, it can be confirmed whether there are a predetermined number of stimulable phosphor sheets present in the radiation image information recording and reading system. If the stimulable phosphor sheets are fed to predetermined positions in advance based on the above information, then a smooth image processing operation can be performed with respect to those stimulable phosphor sheets when the radiation image information system is in operation.

Furthermore, since it is detected whether stimulable phosphor sheets are present or not in predetermined positions in the radiation image information recording and reading system, the number of stimulable phosphor sheets which can successively record radiation image information can easily be confirmed.

Although a certain preferred embodiment has been shown and described it should be understood that many changes and modifications may be made therein without departing from the scope of the appended claims.

What is claimed is:

1. A radiation image information recording and reading system comprising:
    circulatory feed means for feeding stimulable phosphor sheets, which can record radiation images, along a circulatory path;
    an image recording device in said circulatory path for applying radiation which bears image information to one at a time of the stimulable phosphor sheets to record radiation image information in the stimulable phosphor sheet;
    a stimulating light source in said circulatory path for emitting stimulating light rays to scan the stimulable phosphor sheet with the radiation image information recorded therein;
    an image reading device having a photoelectric transducer for reading light emitted from the stimulable phosphor sheet upon exposure to the stimulating light rays and producing an image signal from the read light;
    a remaining image erasing device in said circulatory path for discharging radiation energy remaining on the stimulable phosphor sheet after the recorded radiation image information has been read in said image reading device and before another radiation image is recorded in the stimulable phosphor sheet in said image recording device;
    memory means for storing the number of stimulable phosphor sheets loaded in the radiation image information recording and reading system;

sheet detecting means disposed in said circulatory path, for detecting stimulable phosphor sheets;

counting means for counting the number of stimulable phosphor sheets detected by said sheet detecting means;

actuating means for actuating said circulatory feed means to feed the stimulable phosphor sheets to predetermined positions;

control means for controlling said actuating means when the radiation image information recording and reading system starts to operate; and comparing means for comparing the number of stimulable phosphor sheets stored in said memory means with the number of stimulable phosphor sheets counted by said counting means when the radiation image information recording and reading system starts to operate.

2. A radiation image information recording and reading system according to claim 1, wherein said sheet detecting means comprises a plurality of sensors disposed in said circulatory path, said counting means comprising means for totaling detected signals from said sensors, thereby counting the number of stimulable phosphor sheets.

3. A radiation image information recording and reading system according to claim 1, wherein said control means comprises means for controlling said actuating means to feed the stimulable phosphor sheets from initial positions to positions where they are first detected by said sheet detecting means.

4. A radiation image information recording and reading system comprising:

circulatory feed means for feeding stimulable phosphor sheets, which can record radiation images, along a circulatory path;

an image recording device in said circulatory path for applying radiation which bears image information to one at a time of the stimulable phosphor sheets to record radiation image information in the stimulable phosphor sheet;

a stimulating light source in said circulatory path for emitting stimulating light rays to scan the stimulable phosphor sheet with the radiation image information recorded therein;

an image reading device having a photoelectric transducer for reading light emitted from the stimulable phosphor sheet upon exposure to the stimulating light rays and producing an image signal from the read light;

a remaining image erasing device in said circulatory path for discharging radiation energy remaining on the stimulable phosphor sheet after the recorded radiation image information has been read in said image reading device and before another radiation image is recorded in the stimulable phosphor sheet in said image recording device;

a pre-exposure stand-by device disposed between said remaining image erasing means and said image recording device, for holding at least one stimulable phosphor sheet therein;

sheet detecting means disposed in a predetermined position in said pre-exposure stand-by device and said image recording device, for detecting a stimulable phosphor sheet and producing a detected signal indicative of the detected stimulable phosphor sheet;

image recording detecting means for detecting the recording of radiation image information in the stimulable phosphor sheet in said image recording device, and for producing an image recording signal indicative of the detected recording of radiation image information;

counting means for counting the number of stimulable phosphor sheets which can record radiation image information and is positioned in said predetermined position in said pre-exposure stand-by device and said image recording device, based on the detected signal from said sheet detecting means and the image recording signal from said image recording detecting means; and display means for displaying the number of stimulable phosphor sheets counted by said counting means.

5. A radiation image information recording and reading system according to claim 4, wherein said counting means comprises means for subtracting a value based on the image recording signal from a total value of detected signals from said sheet detecting means.

* * * * *